United States Patent [19]

Landers

[11] 3,981,393
[45] Sept. 21, 1976

[54] LOG TURNING APPARATUS
[75] Inventor: Adrian L. Landers, Emmett, Idaho
[73] Assignee: Adco-West Machinery Manufacturing Company, Emmett, Idaho
[22] Filed: Oct. 8, 1974
[21] Appl. No.: 513,053

[52] U.S. Cl. .......................... 198/379; 144/242 C; 144/246 R; 214/340
[51] Int. Cl.² .......................................... B65G 47/24
[58] Field of Search ........................... 198/237–241, 198/245, 266, 267, 278, 282, 283, 286, 127 R; 214/1 Q, 1 QA, 1 QF, 1 QB, 1 P, 338–340; 144/242 C, 246 R, 246 C, 246 E, 246 F

[56] References Cited
UNITED STATES PATENTS

| 1,791,962 | 2/1931 | Holtus | 198/286 |
| 2,023,880 | 12/1935 | Gassen | 198/286 |
| 2,649,003 | 8/1953 | Peterson | 198/286 |
| 2,664,215 | 12/1953 | Bottenhorn | 198/286 |
| 2,734,618 | 2/1956 | Palmer | 198/286 |

FOREIGN PATENTS OR APPLICATIONS

| 256,203 | 4/1969 | U.S.S.R. | 144/246 R |

Primary Examiner—Evon C. Blunk
Assistant Examiner—Joseph E. Valenza
Attorney, Agent, or Firm—Lawrence E. Laubscher

[57] ABSTRACT

Log turning apparatus is disclosed for rotating an axially travelling log about its longitudinal axis, use being made of a pair of spaced rotatably supported spiked rollers that are arranged on opposite sides of the log, each of said rollers being contained in a plane angularly arranged relative to the axis of the log. The rollers are biased together into frictional peripheral engagement with the peripheral surface of the log, whereupon the rollers are axially displaced in opposite directions to rotate the log about its axis. Preferably the rollers are rotatably supported at the ends of support arms the other ends of which are pivotally connected with the frame of the apparatus. The log is normally horizontal and the rollers are normally vertical and contained in a common plane normal to the longitudinal axis of the log, said support arms being connected with the frame for pivotal movement about either horizontal or vertical pivot axes.

5 Claims, 7 Drawing Figures

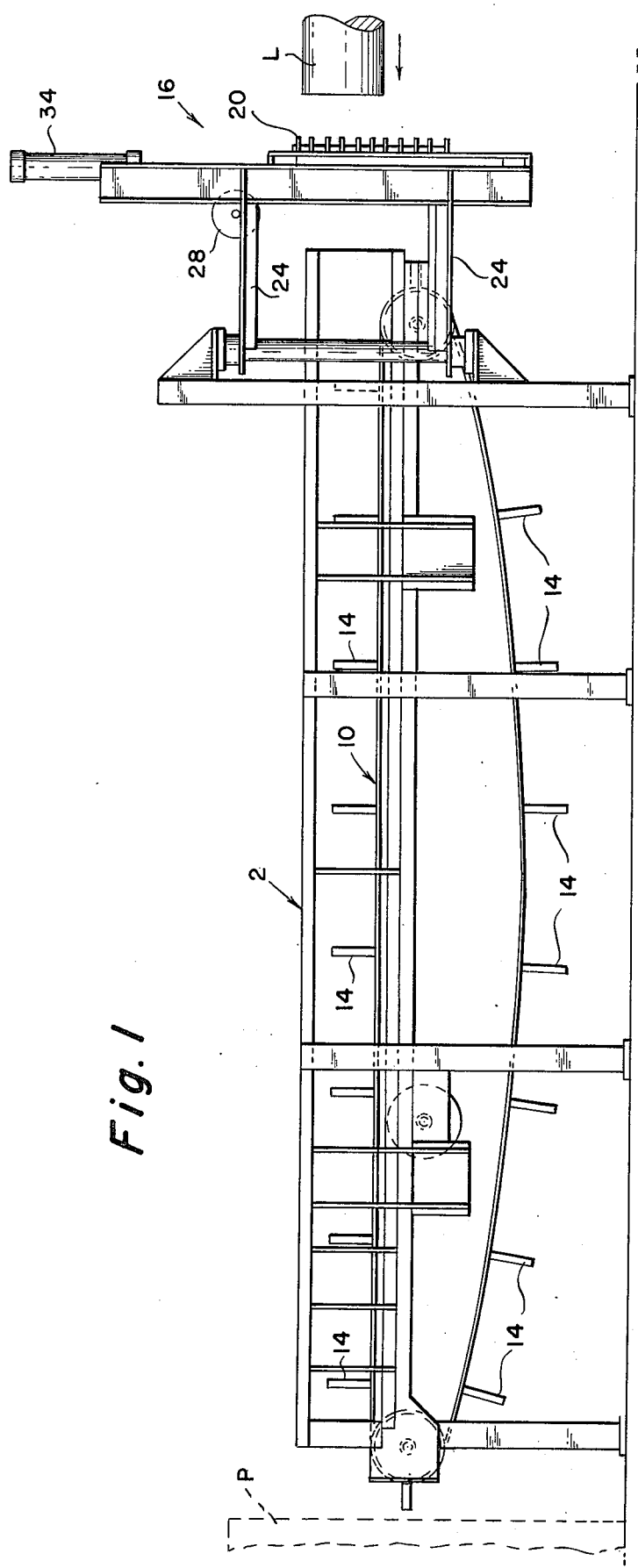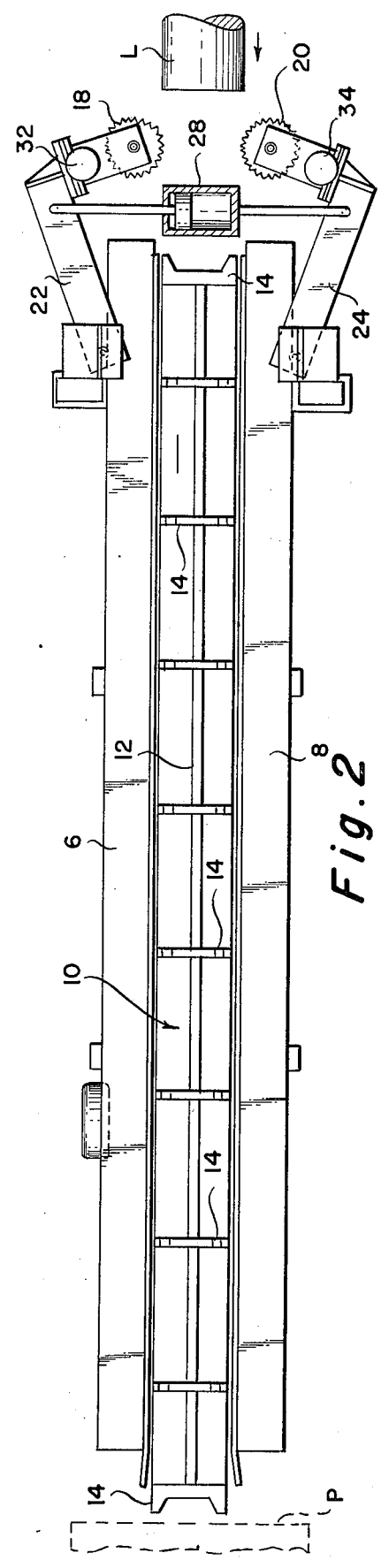

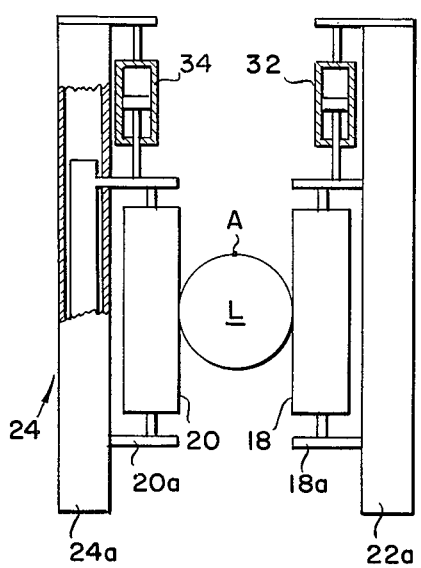
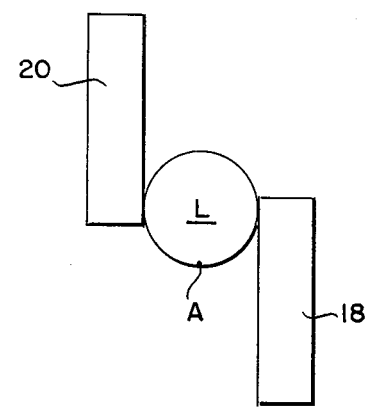
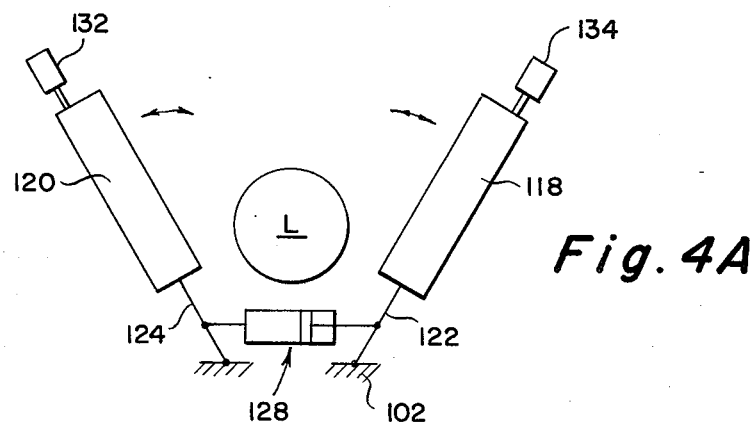
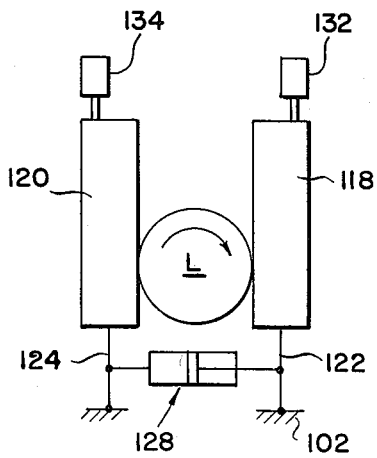
Fig.3A  Fig.3B  Fig.3C
Fig.4A
Fig.4B

LOG TURNING APPARATUS

This invention relates to a log turning apparatus for rotating a log about its longitudinal axis during transport thereof preparatory to, or during processing of, the log.

During the processing of a log, it is often desirable to rotate the log about its longitudinal axis to achieve a desired orientation prior to entry into the processing apparatus. For example, in certain processing operations, as a preliminary step for guidance purposes the bottom surface of the log is machined by protrusion cutter means which remove knots and other regularities, whereby a smooth regular guidance surface is produced. To this end, the ability to rotate the log about its longitudinal axis so that the log is arranged with a preferred surface at its bottom is an important consideration in the design of a log processing system.

Various devices for orienting logs have been proposed in the prior art, which devices normally effect log rotation by tangentially applying forces to the log surface. For example, in the U.S. Pat. No. 3,269,432 to Mellott et al., apparatus is disclosed including a vertically oriented chain for rotating a log against a fixed abutment, and in the U.S. Pat. No. 553,351 to Matthews, a hook member rotates a horizontally oriented log against a vertically oriented group of adjacent horizontally extending rollers. In the U.S. Pat. No. 106,160 to Hill, a pair of horizontally extending rotor members are disposed on opposed sides of a log for rotation in opposite directions to rotate the log against a vertical abutment. Such devices, while relatively simply constructed and maintained, limit the efficiency of a log cutting operation because they all require that axial movement of the log be prevented while the log is being engaged and rotated to the desired orientation by the log turner. Consequently, an otherwise continuous line of production is interrupted. Moreover, once the log is rotated by such apparatus, it is unclamped, whereupon it may roll back to an undesirable orientation while it is progressing to a subsequent processing station.

The Camden et al., U.S. Pat. No. 2,025,337 discloses a log turning device, incorporated in a bark removing apparatus, which continuously rotates logs being continuously conveyed through the apparatus with no interruption of axial movement. The Camden et al. device is characterized by mechanically complex sets of continuously rotating, cooperating rollers oriented in a skewed fashion about the logs passing therethrough. Moreover, such devices are neither intended nor equipped for selective rotation of such logs.

It is therefore a primary object of the present invention to provide an improved log rotating device which affords selective rotation of a log as it is being conveyed by log feeding apparatus.

It is a further object of this invention to provide such apparatus which is capable of holding the continuously conveyed log in position once it has been rotated to a desired orientation.

It is also an object of this invention to provide such an overall improved log feeding apparatus which is of simple and inexpensive construction.

A more specific object of this invention is to provide a log rotating and conveying apparatus for selectively rotating, about its longitudinal axis, a log being conveyed along a given path. The apparatus includes a pair of spaced parallel spiked rollers disposed on opposite sides of the path and mounted for rotating about axes each contained in a plane generally normal to the path of log travel. The apparatus also includes means for laterally displacing the rollers toward each other into frictional engagement with opposite sides of the log periphery, and means for effecting relative axial movement of the rollers when the rollers are in frictional engagement with the log.

Other objects and advantages of the invention will become apparent from a study of the following specification when viewed in light of the accompanying drawings in which:

FIG. 1 is a front elevation view of a first embodiment of a log turning apparatus incorporating the present invention;

FIG. 2 is a plan view of the apparatus shown in FIG. 1;

FIGS. 3A – 3C are schematic representations that illustrate the relative positions of the pair of spiked rolls employed in the inventive apparatus as the rolls move progressively along their axes to rotate the log; and FIGS. 4A and 4B are schematic views of another embodiment of the present invention.

Referring first more particularly to FIG. 1, the infeed conveyor means for feeding a log L to a log processing station P includes a frame 2 containing in its upper surface a longitudinally extending horizontal trough 4 having downwardly converging side walls 6, 8 the bottom edges of which are spaced to receive endless log conveyor means 10. The conveyor means includes an endless sprocket chain 12 that carries in spaced relation a plurality of log support plates 14.

In accordance with the present invention, log turning means 16 are arranged at the input end of the frame, said log turning means including a pair of vertical rollers 18 and 20 that are rotatably supported at one end of support arms 22 and 24, respectively, the other ends of said support arms being pivotally connected with the frame for pivotal movement about vertical pivot axes. Connected between the free ends of the support arms are first pressure fluid-operable piston and cylinder motor means 28 which are operable to bias the spiked rollers 18 and 20 into frictional engagement with the outer periphery of the log L as the log is being introduced into the infeed conveyor.

Referring now to FIG. 3A, the rollers 18 and 20 are rotatably supported in carriages 18a and 20a that are connected for vertical sliding movement relative to channel members 22a and 24a provided at the free ends of the support arms 22 and 24, respectively. Second pressure fluid-operable piston and cylinder motor means 32 and 34 are connected between the carriages 18a and 20a and their respective channel members for effecting independent vertical movement of the rollers in opposite directions relative to their respective support arms. As shown in FIG. 3B, as the rollers 18 and 20 are displaced downwardly and upwardly, respectively, the continuously travelling log is rotated in the clockwise direction to cause point A at the top of the log in FIG. 3A to be displaced to the position shown in FIG. 3B. Continued axial displacement of the rollers 18 and 20 to the positions of FIG. 3C causes point A to be displaced to the bottom of the log, as shown. In accordance with an important feature of the invention, as the log continues its travel onto the infeed conveyor means, the log is maintained in the orientation of FIG. 3C by the inwardly directed biasing force applied to the support arms by the first fluid pressure motor means 28. When the log has completed its travel through the log turning means, motor 28 is operated to separate the rollers, and motors 32 and 34 are operated to axially displace the rollers in opposite vertical directions to return the rollers to their initial FIG. 3A positions.

In the embodiment of FIGS. 1–3, the support arms 22 and 24 are connected with the frame for pivotal movement about vertical pivot axes. In the alternate embodiment illustrated in FIGS. 4A and 4B, the support arms 122 and 124 are connected with the frame 102 for pivotal movement about parallel spaced horizontal pivot axes. The first fluid pressure motor biasing means 128 are operable to pivot the spiked rollers 118 and 120 into and out of frictional engagement with the outer peripheral surface of the log. As in the embodiment of FIGS. 1–3, the rollers are connected for vertical adjustment relative to their respective support arms by suitable sliding connections, not shown, whereby when the rollers are in the engaged position of FIG. 4B, downward axial movement of roller 118 and upward axial movement of roller 120 cause the log L to be rotated about its longitudinal axis in the clockwise direction, as shown.

While in accordance with the provisions of the Patent Statutes the preferred forms and embodiments have been illustrated, it will be apparent that other changes may be made without deviating from the inventive concepts.

What is claimed is:
1. Apparatus for rotating an axially traveling horizontal log about its longitudinal axis, comprising
   a. frame means for supporting the log for axial travel along a given path, said frame means including conveyor means (10) for axially conveying the log along said path;
   b. a pair of support arms (22, 24; 122, 124) pivotally connected with said frame means on opposite sides of the vertical plane containing the path of axial travel of the log;
   c. a pair of cylindrical rollers (18, 20; 118, 120) freely rotatably connected in parallel relation with said support arms, respectively, on opposite sides of the path of travel of the log, each of said rollers also being connected for axial vertical displacement relative to its associated support arm;
   d. first motor means (28, 128) connected at each end between said support arms for pivoting said support arms toward and away from operating positions in which the rollers are vertical, parallel and in frictional engagement with diametrically opposed portions of the log; and
   e. second motor means (32, 34; 132, 134) for axially displacing said rollers in opposite directions relative to their respective support arms when said rollers are in frictional engagement with the log, thereby to rotate the log about its longitudinal axis relative to said frame means.

2. Apparatus as defined in claim 1, wherein the support arms associated with said rollers are pivotally connected with said frame for pivotal movement about parallel pivot axes.

3. Apparatus as defined in claim 2, wherein said first motor means comprises fluid-operable piston and cylinder motor means connected between said support arms.

4. Apparatus as defined in claim 2, wherein said support arms pivot about axes parallel with the axes of said rollers.

5. Apparatus as defined in claim 2, wherein each of said support arms pivots about an axis normal to the plane that contains the axis of the associated roller.

* * * * *